US007717469B2

(12) United States Patent
Tims et al.

(10) Patent No.: US 7,717,469 B2
(45) Date of Patent: *May 18, 2010

(54) EMBOSSED PAPER

(75) Inventors: J. Michael Tims, Kettering, OH (US); Catherine Ayres, Beavercreek, OH (US); Sandra L. Cashman, Springboro, OH (US)

(73) Assignee: MeadWestvaco Corporation, Richmond, VA (US)

(*) Notice: Subject to any disclaimer, the term of this patent is extended or adjusted under 35 U.S.C. 154(b) by 557 days.

This patent is subject to a terminal disclaimer.

(21) Appl. No.: 11/504,160

(22) Filed: Aug. 15, 2006

(65) Prior Publication Data

US 2006/0273575 A1 Dec. 7, 2006

Related U.S. Application Data

(63) Continuation of application No. 10/360,084, filed on Feb. 7, 2003, now Pat. No. 7,118,135.

(51) Int. Cl.
*G09B 11/00* (2006.01)
*G09B 19/08* (2006.01)

(52) U.S. Cl. ........................................ 283/45; 283/117

(58) Field of Classification Search ................. 283/117, 283/45, 115; 434/112, 113, 117, 163, 164
See application file for complete search history.

(56) References Cited

U.S. PATENT DOCUMENTS

| | | | | |
|---|---|---|---|---|
| 6,271 | A | | 12/1830 | Forbriger |
| 12,391 | A | | 2/1855 | MacLaurin |
| 14,488 | A | | 3/1856 | Davis |
| D8,071 | S | * | 2/1875 | Cone ............................ D19/1 |
| 433,725 | A | | 8/1890 | Ewing |
| 636,432 | A | | 11/1899 | Horney |
| 716,629 | A | | 12/1902 | Dodge |

(Continued)

FOREIGN PATENT DOCUMENTS

| | | |
|---|---|---|
| DE | 3226758 | 3/1983 |

(Continued)

OTHER PUBLICATIONS

Sheet described in Attachment A; date unknown. Applicants admit the status of this publication as prior art for the limited purpose of examination of this application and reserve the right to challenge the status of this publication as prior art.

(Continued)

*Primary Examiner*—Dana Ross
*Assistant Examiner*—Pradeep C Battula
(74) *Attorney, Agent, or Firm*—Alison R. Scheidler; Donald G. Bauer; Steven Elleman

(57) ABSTRACT

A sheet of embossed paper including a sheet-like body portion, at least one embossed or depressed line located on the body portion, and at least one printed line located on and extending at least partially along the embossed or depressed line. The invention may also include a notebook including a plurality of sheets of paper, each sheet including a sheet-like body portion, at least one embossed or depressed line located on the body portion, and at least one printed line located on and extending at least partially along the embossed or depressed line. The notebook may include binding means binding the plurality of sheets together.

17 Claims, 3 Drawing Sheets

U.S. PATENT DOCUMENTS

| | | | | |
|---|---|---|---|---|
| 1,061,913 | A | 5/1913 | Hughes | |
| 1,332,761 | A | 3/1920 | Sargent | |
| 1,371,430 | A | 3/1921 | Nickerson | |
| 1,414,102 | A | 4/1922 | Sorby | |
| 1,426,055 | A | 8/1922 | Fast | |
| 1,887,160 | A | 11/1932 | Lorber | |
| 1,887,161 | A | 11/1932 | Lorber | |
| 1,887,163 | A | 11/1932 | Lorber | |
| 2,068,497 | A | 1/1937 | Lorber | |
| 2,277,329 | A | 3/1942 | Kimbrough | |
| 2,371,153 | A | 3/1945 | Connelly | |
| 2,454,632 | A | 11/1948 | Cohn | |
| 2,456,632 | A | 12/1948 | Greenberg | |
| 2,616,198 | A | 11/1952 | Sewell | |
| 2,850,811 | A | 9/1958 | Boley | |
| 3,015,267 | A | 1/1962 | Dashew | |
| 3,197,892 | A | 8/1965 | Hancy | |
| 3,314,171 | A | 4/1967 | Bethune | |
| 3,382,592 | A | 5/1968 | Lucero | |
| 3,423,851 | A | 1/1969 | Olalainty | |
| 3,486,246 | A | 12/1969 | Johnson, Jr. | |
| 3,512,273 | A | 5/1970 | Baker, et al. | |
| 3,526,975 | A | 9/1970 | Reeves | |
| 3,574,956 | A | 4/1971 | Hamelin | |
| 3,667,139 | A * | 6/1972 | Barr | 434/113 |
| 3,683,516 | A | 8/1972 | Fass | |
| 3,733,468 | A | 5/1973 | Eberly, Jr. | |
| 3,816,943 | A | 6/1974 | Henry | |
| 3,869,813 | A | 3/1975 | Hancy | |
| 3,959,894 | A | 6/1976 | Hanson et al. | |
| 4,035,652 | A | 7/1977 | Schroeder | |
| 4,130,946 | A | 12/1978 | Coady | |
| 4,173,082 | A | 11/1979 | Niquette | |
| 4,245,013 | A | 1/1981 | Clegg et al. | |
| 4,268,256 | A | 5/1981 | Moskowitz | |
| 4,425,095 | A | 1/1984 | Morris | |
| 4,552,536 | A | 11/1985 | Kay et al. | |
| 4,626,219 | A | 12/1986 | Goldreyer | |
| 4,650,421 | A | 3/1987 | Anczurowski | |
| 4,669,986 | A | 6/1987 | Yokoyama | |
| 4,685,885 | A | 8/1987 | Maddocks | |
| 4,735,516 | A | 4/1988 | Galarneau | |
| 4,846,688 | A | 7/1989 | Jones | |
| 4,859,094 | A | 8/1989 | Okada | |
| 4,865,547 | A | 9/1989 | Glover | |
| 4,988,126 | A | 1/1991 | Heckenkamp et al. | |
| 5,217,378 | A | 6/1993 | Donovan | |
| 5,232,535 | A | 8/1993 | Brinley | |
| 5,516,291 | A | 5/1996 | Miyake | |
| 5,722,693 | A | 3/1998 | Wicker | |
| 6,142,783 | A | 11/2000 | Rocha | |
| 6,302,696 | B1 | 10/2001 | O'Neill | |
| 6,459,364 | B2 | 10/2002 | Gupta | |
| 6,669,478 | B2 | 12/2003 | Edwards et al. | |
| 7,118,135 | B2 | 10/2006 | Tims et al. | |
| D534,951 | S * | 1/2007 | Woodward | D19/1 |
| 2002/0127519 | A1 | 9/2002 | Bhatt et al. | |
| 2004/0096807 | A1 | 5/2004 | McGannon | |

FOREIGN PATENT DOCUMENTS

| | | |
|---|---|---|
| DE | 19549618 | 4/1997 |
| GB | 117420 | 7/1918 |

OTHER PUBLICATIONS

Sheet described in Attachment B; date unknown. Applicants admit the status of this publication as prior art for the limited purpose of examination of this application and reserve the right to challenge the status of this publication as prior art.

* cited by examiner

EMBOSSED PAPER

This application is a continuation of U.S. application Ser. No. 10/360,084, filed on Feb. 7, 2003, now U.S. Pat. No. 7,118,135, the entire contents of which are hereby incorporated by reference.

The present invention is directed to writing paper, and more particularly, to writing paper including at least one embossed line located thereon.

BACKGROUND

Writing paper is often used by school children and others to develop and refine their writing skills. The writing paper may include a plurality of lines located thereon to provide guides to the user. Furthermore, some writing paper may include embossed lines for guides to the user. However, such embossed writing paper may not include any written lines or other indicia located thereon to provide a visual guide or feedback to the user. Accordingly, there is a need for improved, embossed writing paper.

SUMMARY

In one embodiment, the present invention is embossed paper including at least one embossed line and at least one printed line located at least partially thereon. In particular, in one embodiment the invention is a sheet of embossed paper including a sheet-like body portion, at least one embossed or depressed line located on the body portion, and at least one printed line located on and extending at least partially along the embossed or depressed line. In another embodiment, the invention is a notebook including a plurality of sheets of paper, each sheet including a sheet-like body portion, at least one embossed or depressed line located on the body portion, and at least one printed line located on and extending at least partially along the embossed or depressed line. The notebook may include binding means binding the plurality of sheets together.

Other objects and advantages of the present invention will be apparent from the following description and the accompanying drawings.

DETAILED DESCRIPTION

Figure 1:
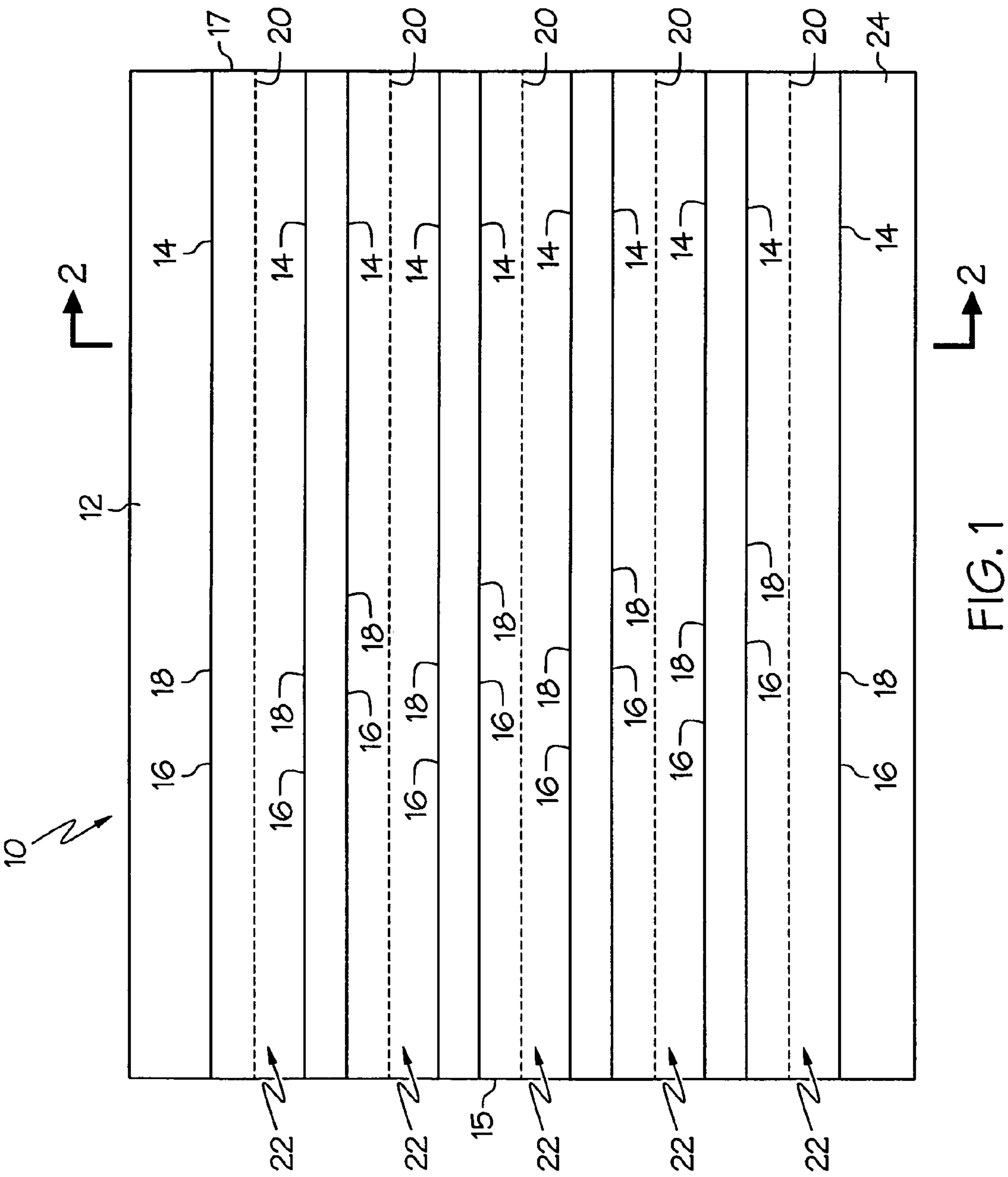
FIG. 1 is a top view of one embodiment of the paper of the present invention.

As shown in FIG. 1, the sheet 10 of the present invention may include a sheet-like body portion 12 having an outer perimeter. The body portion 12 can be made from nearly any material which can be written upon, including but not limited to, plastics or fiber-based paper made from a cellulose-based or cellular based fiber pulp, synthetic materials, or a blend of pulp and synthetic materials. The sheet 10 may include a plurality of generally straight, parallel guidelines 14 extending the entire distance from one edge 15 of the sheet 10 to an opposite edge 17.

Figure 2:
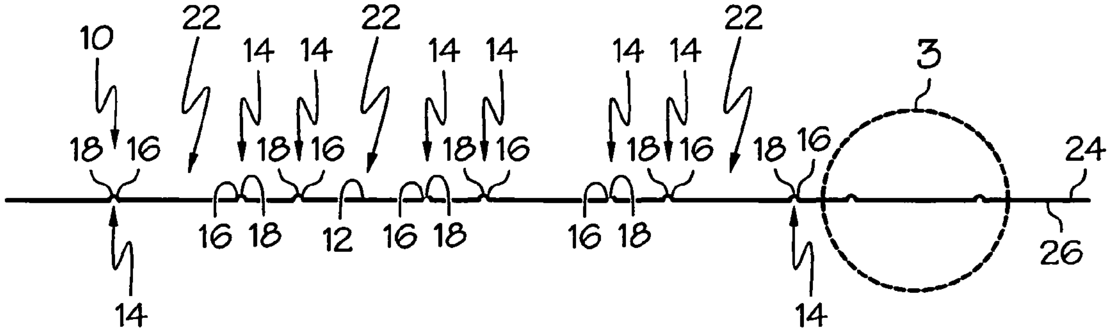
FIG. 2 is a side cross section take along line 2-2 of FIG. 1.
Figure 3:
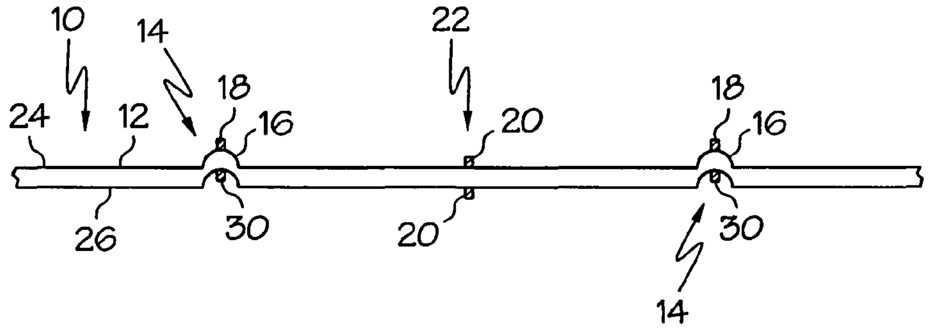
FIG. 3 is a detail view of area 3-3 of the sheet of FIG. 2.

As shown in FIGS. 2 and 3, each guideline 14 may include a preformed straight embossed line 16 and a pre-printed straight line 18 located on the embossed line 16. In other words, each guideline 14 may be formed by an embossed line 16, with a printed line 18 located on top of the embossed line 16. Each guideline 14 may extend the entire distance from one edge 15 of the sheet 10 to the opposite edge 17, or may extend the majority of a dimension (width or length) of the sheet 10, for example, at least about 50% of the length or width of the sheet 10, or at least about 90% of the length or width of the sheet 10. The embossed lines 16 may be created by a wide variety of methods utilizing nearly any embossing technique as are well known in the art, such as by passing the sheet under an embossing roll or wheel, or between the nip of a pair of embossing rolls, etc.

The guidelines 14 may be spaced apart a sufficient distance to define a writing area 22 therebetween. For example, adjacent ones of the guidelines 14 may be spaced apart by a distance of between about ¼" and about 2" to define a writing area 22 therebetween. The sheet 10 may include a plurality of intermediate lines 20, with each intermediate line 20 being located between an adjacent pair of guidelines 14 and in one of the writing areas 22. In the illustrated embodiment, each of the intermediate lines 20 is a printed dotted line located on a generally flat portion of the body portion 12 (that is, not on an embossed portion of the sheet 10).

Each embossed line 16 may include a bead that is raised relative to the front side 24 of the body portion 12 and depressed relative to the rear side 26 of the body portion. As shown in FIG. 3, the sheet 10 may include a printed line 18 located on the front side 24 of the sheet 10 and on each embossed line 16 (each printed line 18 being schematically illustrated in FIG. 3 by a dark rectangle).

Each embossed line 16 may also include a printed line 30 located on the rear side 26 and extending generally parallel thereto. Relative to the rear side 26 of the paper 10, each embossed line 16 may appear as a "debossed" line or a "line of depression." Thus, in this case each guideline 14 may include a debossed line with a printed line 30 located thereon. The rear side 26 of the sheet 10 may also include the intermediate guidelines 20 printed thereon. Accordingly, a top view of the rear side 26 of the sheet 10 may appear identical to the top view of the front side 24 of the sheet 10 shown in FIG. 1.

Each of the guidelines 14 may provide both a tactile and visual guide to the user, for example, when the user writes in the writing area 22. In particular, if the user's writing instrument engages or passes over a guideline 14, the resultant bump or area of depression can provide tactile feedback to the user. Furthermore, because each guideline 14 includes a printed line 18, 30, the user can also visually note when the writing or writing instrument has extended beyond the bounds of the writing area 22. Thus, the combination of the printed line 18, 30 and embossed or debossed line 16 of each guideline 14 can provide enhanced feedback so that a user can learn to stay in the writing area 22 to improve his or her writing skills.

Figure 4:
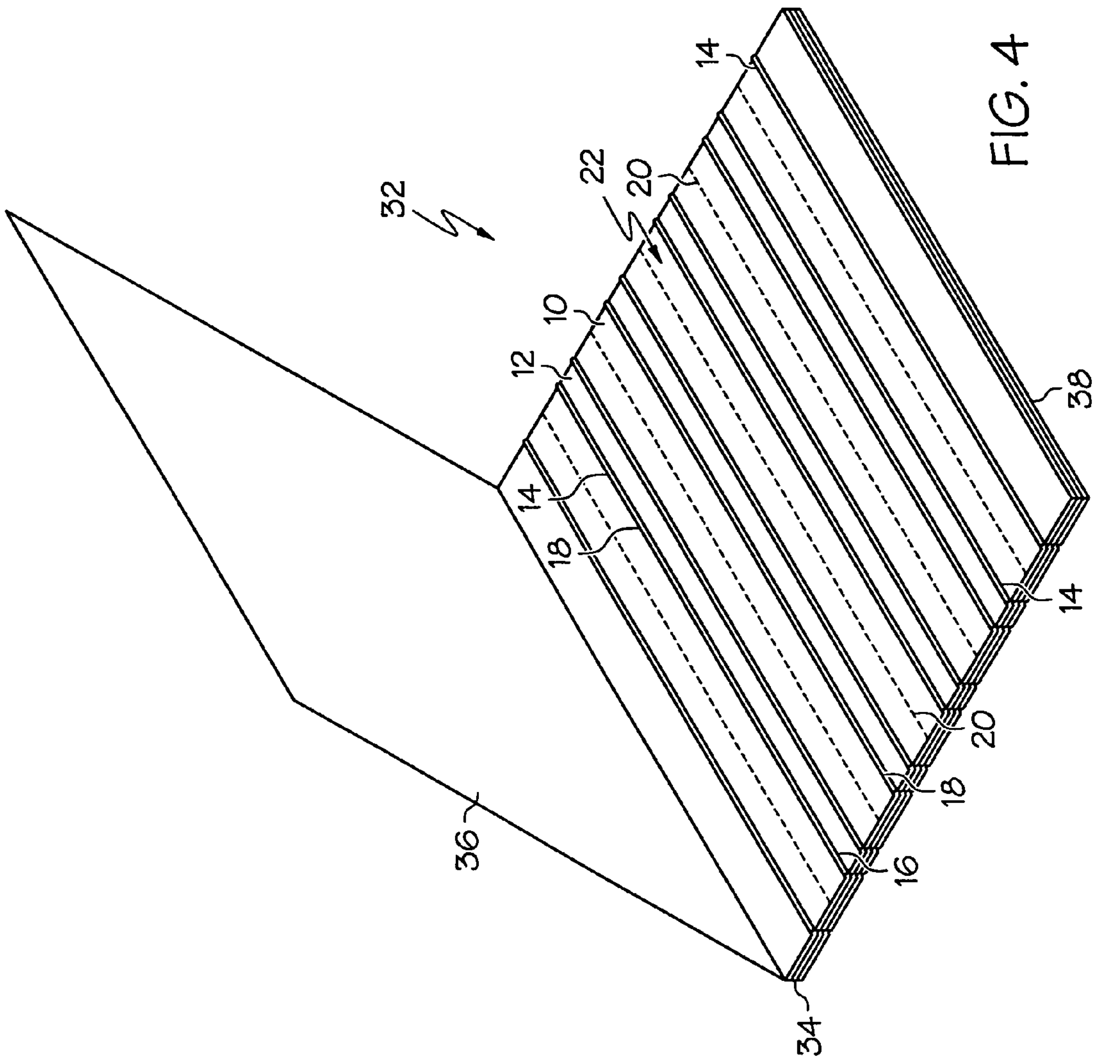
FIG. 4 is a front perspective view of a notebook of papers.

As shown in FIG. 4, a plurality of sheets 10 may be bound together by a binding mechanism 34 to form a notebook 32 having a front cover 36 and a rear cover 38. The front 36 and rear 38 covers may be made from a relatively stiff material, such as cardboard or plastics, to protect the sheets 10 and provide stiffness and structure to the notebook 32. In the illustrated embodiment the binding mechanism 34 is an adhesive binder, but the binding mechanism 34 can take any of a variety of forms including but not limited to clips, clasps, binder rings, spiral binder, staples, shrink-wrap or other packaging, etc.

Having described the invention in detail and by reference to the preferred embodiments, it will be apparent that modifications and variations thereof are possible without departing from the scope of the invention.

What is claimed is:

1. A sheet of embossed material comprising:

a sheet-like body portion of cellular based or pulp based paper having an outer perimeter with a pair of opposed outer edges defining a dimension therebetween;

at least one preformed straight embossed or depressed line located on said body portion extending substantially an entire distance of said dimension between said opposed outer edges; and at least one pre-printed straight line located on and extending at least partially along said preformed embossed or depressed line, wherein said preformed embossed or depressed line and said pre-printed line are provided to guide the writing of a user on said body portion;

wherein said pre-printed line is located on and extends generally parallel to said embossed or depressed line, wherein said sheet includes an auxiliary preformed embossed or depressed line extending generally parallel to said embossed or depressed line and an auxiliary pre-printed line located on and extending generally parallel to said auxiliary embossed or depressed line, wherein said embossed or depressed line and said auxiliary embossed or depressed line are spaced apart by a distance of between about ¼" and about 2" to define a writing area therebetween, and wherein said body portion further includes a pre-printed guide line located between said embossed or depressed line and said auxiliary embossed or depressed line and extending generally parallel thereto, said pre-printed guide line not being located on an embossed or depressed line.

2. The sheet of claim 1 wherein said pre-printed line is located on said embossed or depressed line for a majority of a length of said embossed or depressed line.

3. The sheet of claim 1 wherein said pre-printed line extends substantially the entire distance of said dimension between said opposed outer edges.

4. The sheet of claim 1 wherein said body portion includes a plurality of preformed embossed or depressed lines located on said body portion and a plurality of pre-printed lines located on said body portion, wherein said plurality of preformed embossed or depressed lines and said plurality of pre-printed lines extend substantially the entire distance of said dimension between said opposed outer edges.

5. The sheet of claim 4 wherein each pre-printed line extends generally parallel to an associated preformed embossed or depressed line and is located on the corresponding embossed or depressed line.

6. The sheet of claim 1 wherein said body portion further includes a back side preprinted line located on an opposite side of said body portion on said embossed or depressed line, and wherein said back side pre-printed line extends generally parallel to said embossed or depressed line.

7. The sheet of claim 6 wherein said back side pre-printed line extends generally the entire length of said embossed or depressed line.

8. The sheet of claim 1 wherein said preformed embossed or depressed line extends the entire distance of said dimension between said opposed outer edges.

9. A sheet of embossed material comprising:

a sheet-like body portion of cellular based or pulp based material having an outer perimeter with at least a pair of opposed outer edges defining a dimension therebetween;

at least one of: a generally continuous embossed line located on said body portion extending substantially the entire distance of said dimension between said opposed outer edges; or a generally continuous depressed line located on said body portion extending substantially the entire distance of said dimension between said opposed outer edges; and at least one printed line located on and extending at least partially along said at least one embossed or depressed line;

wherein said embossed or depressed line is generally straight and said printed line is located on and extends generally parallel to said embossed or depressed line, wherein said sheet includes an auxiliary embossed or depressed line extending generally parallel to said embossed or depressed line and an auxiliary printed line located on and extending generally parallel to said auxiliary embossed or depressed line, wherein said embossed or depressed line and said auxiliary embossed or depressed line are spaced apart by a distance of between about ¼" and about 2" to define a writing area therebetween, and wherein said body portion further includes a printed guide line located between said embossed or depressed line and said auxiliary embossed or depressed line and extending generally parallel thereto, said printed guide line not being located on an embossed or depressed line.

10. The sheet of claim 9 wherein said at least one embossed or depressed line is continuous such that said at least one embossed or depressed line constitutes only a continuous embossed line, and not a depressed line, across substantially the entire distance of said dimension, or constitutes only a continuous depressed line, and not an embossed line, across substantially the entire distance of said dimension.

11. The sheet of claim 9 wherein said embossed or depressed line is preformed, and wherein said printed line is pre-printed.

12. The sheet of claim 9 wherein said printed line is located on said embossed or depressed line for a majority of a length of said embossed or depressed line.

13. The sheet of claim 9 wherein said printed line extends substantially the entire distance of said dimension between said opposed outer edges.

14. The sheet of claim 9 wherein said body portion includes a plurality of generally continuous embossed or depressed lines located on said body portion and a plurality of printed lines located on said body portion, wherein said plurality of embossed or depressed lines and said plurality of printed lines extend substantially the entire distance of said dimension between said opposed outer edges.

15. The sheet of claim 9 wherein said body portion further includes a back side printed line located on an opposite side of said body portion on said embossed or depressed line, and wherein said back side printed line extends generally parallel to embossed or depressed line.

16. The sheet of claim 15 wherein said back side printed line extends generally the entire length of said embossed or depressed line.

17. The sheet of claim 9 wherein said generally continuous embossed or depressed line extends the entire distance of said dimension between said opposed outer edges.

* * * * *